United States Patent
Vardhe et al.

(10) Patent No.: US 11,811,631 B1
(45) Date of Patent: Nov. 7, 2023

(54) METHODS AND SYSTEM TO VALIDATE A CHANGE IN A COMPUTER NETWORKING SYSTEM

(71) Applicant: Nile Global, Inc., San Jose, CA (US)

(72) Inventors: Dipen Vardhe, San Jose, CA (US);
Suresh Katukam, Milpitas, CA (US);
Gopal Raman, San Jose, CA (US);
Tjandra Trisno, San Jose, CA (US)

(73) Assignee: Nile Global, Inc., San Jose, CA (US)

( * ) Notice: Subject to any disclaimer, the term of this patent is extended or adjusted under 35 U.S.C. 154(b) by 0 days.

(21) Appl. No.: 17/721,819

(22) Filed: Apr. 15, 2022

(51) Int. Cl.
*H04L 43/0811* (2022.01)
*H04L 12/10* (2006.01)
*H04L 43/10* (2022.01)
*H04L 41/0893* (2022.01)

(52) U.S. Cl.
CPC .......... *H04L 43/0811* (2013.01); *H04L 12/10* (2013.01); *H04L 41/0893* (2013.01); *H04L 43/10* (2013.01)

(58) Field of Classification Search
CPC ...... H04L 12/10; H04L 41/0893; H04L 43/10
See application file for complete search history.

(56) References Cited

U.S. PATENT DOCUMENTS

| | | | |
|---|---|---|---|
| 8,677,343 B2 | 3/2014 | Averbuch et al. | |
| 9,015,694 B2 | 4/2015 | Gray et al. | |
| 9,081,643 B2 | 7/2015 | Wang et al. | |
| 10,331,428 B1 * | 6/2019 | Zalpuri | G06F 8/654 |
| 11,516,067 B1 * | 11/2022 | Marshall | H04L 43/04 |
| 2010/0182907 A1 * | 7/2010 | Pinter | H04L 47/70 370/235 |
| 2013/0211782 A1 * | 8/2013 | Rosenberg | B25J 9/16 702/182 |
| 2021/0019413 A1 * | 1/2021 | Deck | G06F 21/57 |
| 2021/0185565 A1 * | 6/2021 | Kalderen | H04L 41/0893 |
| 2022/0321408 A1 * | 10/2022 | Mahimkar | H04L 43/0817 |

* cited by examiner

*Primary Examiner* — Viet D Vu
(74) *Attorney, Agent, or Firm* — LOZA & LOZA, LLP

(57) ABSTRACT

Embodiments of methods and a system to validate a change in a computer networking system are disclosed. In an embodiment, a method to validate a change in a computer networking system includes identifying, at a network management system, at least one candidate device, where a candidate device has a network connection to a device that is a target of the change in the computer networking system, collecting, at the network management system, metrics related to the at least one candidate device, triggering, by the network management system, the change at a target device, and validating, at the network management system, the change in the computer networking system using the metrics of the at least one candidate device.

23 Claims, 6 Drawing Sheets

METHODS AND SYSTEM TO VALIDATE A CHANGE IN A COMPUTER NETWORKING SYSTEM

BACKGROUND

In computer networking systems, one or more devices (e.g., networking systems and/or end devices) may be changed to improve performance. For example, a networking system may be changed by a software update to to improve communication techniques. Typically, the success of the update is based on responses or metrics from the networking system that received the change. However, end devices that are connected and/or communicating with the networking system may experience performance degradation and/or a difference in experience after the change has been made. Consequently, computer networking systems may experience limited performance as they may not recognize that the change negatively affected the end devices connected to the networking system.

SUMMARY

Embodiments of methods and a system to validate a change in a computer networking system are disclosed. In an embodiment, a method to validate a change in a computer networking system includes identifying, at a network management system, at least one candidate device, where a candidate device has a network connection to a device that is a target of the change in the computer networking system, collecting, at the network management system, metrics related to the at least one candidate device, triggering, by the network management system, the change at a target device, and validating, at the network management system, the change in the computer networking system using the metrics of the at least one candidate device.

In an embodiment, identifying the at least one candidate device involves polling, by the network management system, candidacy information of at least one end device included in the computer networking system, and determining, at the network management system, whether the at least one end device qualifies as the at least one candidate device using the candidacy information.

In an embodiment, the at least one end device qualifies as the at least one candidate device if the candidacy information meets candidacy criteria.

In an embodiment, the candidacy criteria is met if the at least one end device has not been offline for more than an amount of time it takes for a networking system to reboot, where the reboot is caused by a previous change to the computer networking system.

In an embodiment, the candidacy criteria is met if the at least one end device has reconnected to a same interface after previous changes to the computer networking system.

In an embodiment, the candidacy criteria is met if a location of the at least one end device has not varied after previous changes to the computer networking system.

In an embodiment, the candidacy criteria is met if a fingerprint analysis determines that the at least one end device is a stationary device.

In an embodiment, the candidacy criteria is met if a Power over Ethernet (PoE) budget allocated to a port of the at least one end device supports a predetermined PoE protocol.

In an embodiment, the at least one end device does not qualify as the at least one candidate device if the candidacy information does not meet candidacy criteria.

In an embodiment, the candidacy information includes at least one of a time of connection of the end device to a networking system, an uptime of a link between the end device and the networking system, a location of the end device, a fingerprint of the end device, and power consumption of the end device.

In an embodiment, the method involves collecting, at the network management system, additional metrics related to the at least one candidate device after the change is triggered at the target device.

In an embodiment, the method involves collecting, at the network management system, additional metrics related to the at least one candidate device after the change is triggered at the target device, and where validating the change in the computer networking system involves determining, at the network management system, whether acceptance criteria is met by comparing the metrics collected before the change and the additional metrics collected after the change.

In an embodiment, the validation is successful if a pre-determined threshold of candidate devices reconnect to the computer networking system after the change.

In an embodiment, the validation is successful if a pre-determined threshold of candidate devices exhibit a post-change level of data usage that is within a predetermined range of a pre-change level of data usage.

In an embodiment, the validation is successful if a pre-determined threshold of candidate devices exhibit a post-change level of power usage that is within a predetermined range of a pre-change level of power usage.

In an embodiment, the method involves leaving the change in place if the validation is successful.

In an embodiment, the method involves reversing the change if the validation is not successful.

In an embodiment, the metrics related to the at least one candidate device are collected by the network management system at preset time intervals.

Another method is also disclosed. The method includes identifying, at a network management system, at least one candidate device, where a candidate device has a network connection to a device that is a target of the change in the computer networking system, collecting, at the network management system, a first set of metrics related to the at least one candidate device, triggering, by the network management system, the change at a target device, collecting, at the network management system, a second set of metrics related to the at least one candidate device, and validating, at the network management system, the change in the computer networking system using the first set of metrics and the second set of metrics.

A system is also disclosed. The system includes a network management system configured to identify at least one candidate device, where a candidate device has a network connection to a device that is a target of the change in the computer networking system, collect metrics related to the at least one candidate device, trigger the change at a target device, and validate the change in the computer networking system using the metrics of the at least one candidate device.

Other aspects in accordance with the invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

Figure 1:
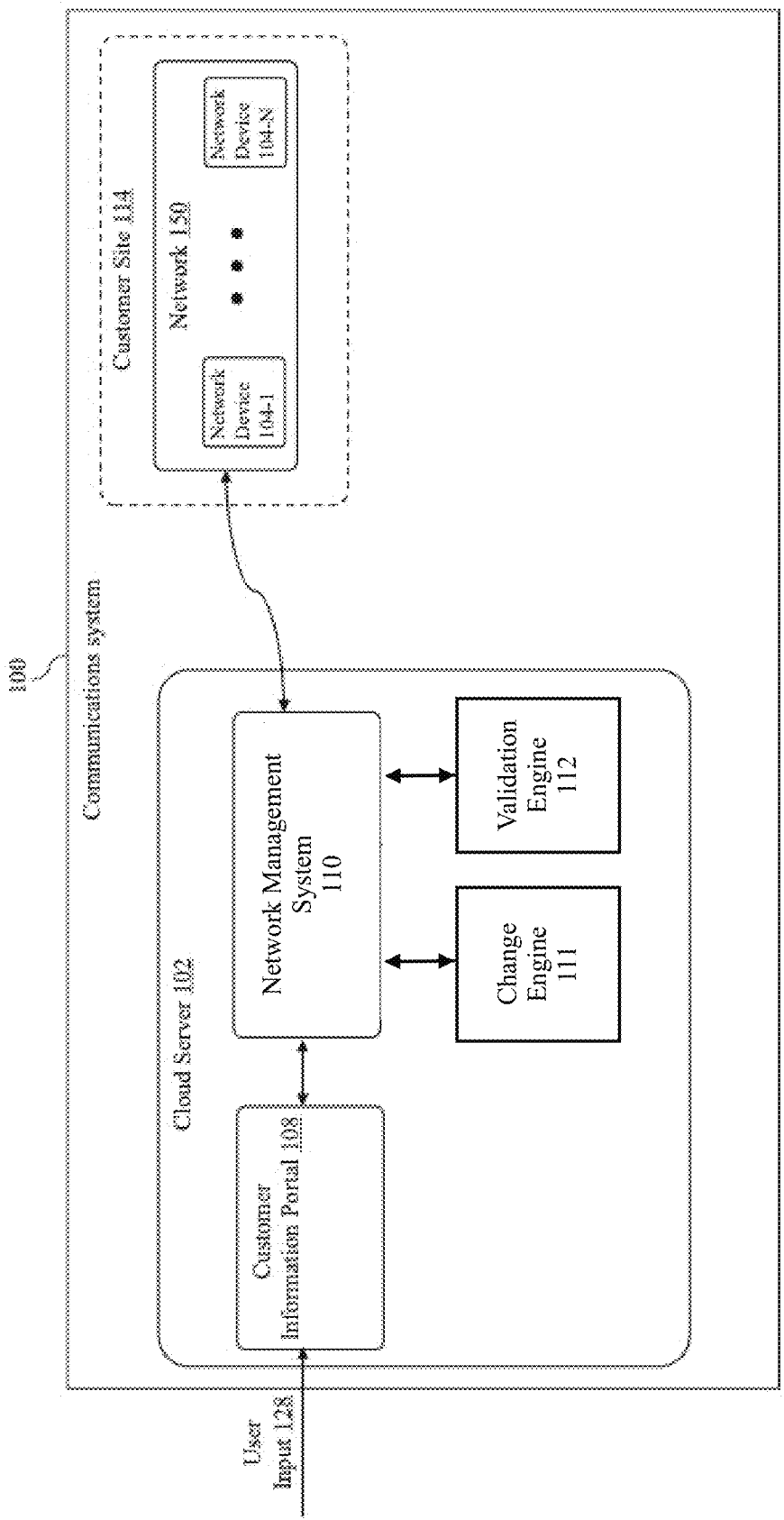
FIG. 1 depicts a communications system in accordance with an embodiment of the invention.

FIG. 1 depicts a communications system 100 in accordance with an embodiment of the invention. In some embodiments, the communications system 100 may be a computer networking system. In the embodiment depicted in FIG. 1, the communications system includes a cloud server 102 and at least one deployed network 150 within a customer site 114. The cloud server and/or the deployed network may be implemented in hardware (e.g., circuits), software, firmware, or a combination thereof. Although the illustrated communications system 100 is shown with certain components and described with certain functionality herein, other embodiments of the communications system may include fewer or more components to implement the same, less, or more functionality. For example, in some embodiments, the communications system includes more than one cloud server, more than one deployed network, and/or more than one customer site. In another example, although the cloud server and the deployed network are shown in FIG. 1 as being connected in a certain topology, the network topology of the communications system 100 is not limited to the topology shown in FIG. 1.

The cloud server 102 can be used to provide at least one service to a customer site (e.g., to the deployed network 150 located at the customer site 114). The cloud server may be configured to facilitate or perform a network management service (e.g., a validation service) to network devices (e.g., the deployed network 150) at the customer site. Because the cloud server can facilitate or perform a network management service or operation for network devices at the customer site, network management efficiency can be improved. In addition, because the cloud server can facilitate or perform a network management service or operation for network devices at the customer site, a user or customer of the customer site can be notified of a device and/or network change. Consequently, device and/or network changes can be monitored.

In some embodiments, the cloud server is configured to generate a user interface to obtain input information, for example, a floor plan of a customer site. In some embodiments, the user interface includes a graphical user interface.

The cloud server may be implemented in hardware (e.g., circuits), software, firmware, or a combination thereof. In some embodiments, the cloud server is hosted or executed in a public cloud computing environment such as Amazon Web Services (AWS), and/or a private cloud computing environment such as an enterprise cloud server. In some embodiments, the cloud server is implemented on a server grade hardware platform, such as an x86 architecture platform. For example, the hardware platform of the cloud server may include conventional components of a computing device, such as one or more processors (e.g., central processing units (CPUs)), system memory, a network interface, storage system, and other Input/Output (I/O) devices such as, for example, a mouse and a keyboard (not shown).

In some embodiments, the processor is configured to execute instructions such as, for example, executable instructions that may be used to perform one or more operations described herein and may be stored in the memory and the storage system. In some embodiments, the memory is volatile memory used for retrieving programs and processing data. The memory may include, for example, one or more random access memory (RAM) modules. In some embodiments, the network interface is configured to enable the cloud server to communicate with another device via a communication medium. The network interface may be one or more network adapters, also referred to as a Network Interface Card (NIC). In some embodiments, the cloud server includes local storage devices (e.g., one or more hard disks, flash memory modules, solid state disks and optical disks) and/or a storage interface that enables the host to communicate with one or more network data storage systems, which are used to store information, such as executable instructions, cryptographic keys, virtual disks, configurations, and other data.

In the embodiment depicted in FIG. 1, the cloud server 102 includes a network management system 110, a customer information portal 108 connected to the network management system 110, a change engine 111 connected to the network management system 110, and a validation engine 112 connected to the network management system 110. In some embodiments, the change engine 111 is configured to store changes for a network deployed and/or to be deployed at the customer site (e.g., a list of network devices deployed or to be deployed at the customer site). In some embodiments, the validation engine 112 is a rules-based engine used to store and execute candidacy and validation rules, and is configured to validate the changes. The network management system, the customer information portal, the change engine, and/or the validation engine may be implemented in hardware (e.g., circuits), software, firmware, or a combination thereof.

Although the illustrated cloud server is shown with certain components and described with certain functionality herein, other embodiments of the cloud server may include fewer or more components to implement the same, less, or more functionality. For example, in some embodiments, the cloud server includes more than one network management system, more than one customer information portal, more than one change engine, and/or more than one validation engine. In another example, although the network management system, the customer information portal, the change engine, and the validation engine are shown in FIG. 1 as being connected in a certain topology, the network topology of the cloud server is not limited to the topology shown in FIG. 1. In addition, although the customer information portal 108 is shown in FIG. 1 as being a component of the cloud server 102, in other embodiments, the customer information portal may be implemented outside of the cloud server.

In some embodiments, the network management system 110 is configured to trigger or implement a change (e.g., software upgrade, operational update, configurational change, Internet Protocol (IP) address change, Virtual Local Area Network (VLAN) change, wireless channel change, etc.) at network devices (e.g., the deployed network 150) at the customer site 114. In some embodiments, the network management system 110 is configured to generate and/or transmit at least one alert (e.g., a change alert) regarding a network deployed and/or to be deployed at the customer site or a network operator site, for example, to an administrator or a user or customer (e.g., a layperson such as a worker on-site or an end-user such as an employee) at the customer site 114.

Because the network management system can facilitate or perform network diagnostics for network devices at the customer site, network efficiency and performance can be monitored. In addition, because the network management system can facilitate or perform a network management service or operation for network devices at the customer site, an administrator or a customer can be notified of device and/or network conditions or changes.

The customer information portal 108 is configured to receive user input 128. In some embodiments, the customer information portal is configured to include or generate a user interface that allows a customer to input information related to the customer site 114 (e.g., the floor plan of the customer site 114) and/or information associated with a network management system service for the customer site 114, such as one or more specific requirements or restrictions.

In the communications system 100 depicted in FIG. 1, the customer site 114 may include one or more buildings, and each building may include one or more floors. Network devices that can be deployed at the customer site may include any type of suitable network devices. For example, network devices may be designated to be deployed to a specific building, a specific floor within a building, and/or a specific location on a floor of a building. A network device that can be deployed at the customer site may be fully or partially implemented as an Integrated Circuit (IC) device.

In the embodiment depicted in FIG. 1, the network 150 includes one or more network devices 104-1, . . . , 104-N, where N is a positive integer. In some embodiments, at least one of the one or more network devices 104-1, . . . , 104-N is a wired and/or wireless communications device that includes at least one processor (e.g., a microcontroller, a digital signal processor (DSP), and/or a CPU), at least one wired or wireless communications transceiver implemented in one or more logical circuits and/or one or more analog circuits, at least one wired or wireless communications interface that supports at least one wired or wireless communications protocol, and/or at least one antenna. For example, at least one of the one or more network devices 104-1, . . . , 104-N is compatible with Institute of Electrical and Electronics Engineers (IEEE) 802.3 protocol and/or one or more wireless local area network (WLAN) communications protocols, such as IEEE 802.11 protocol, and/or a short-range communications protocol, such as Bluetooth. In some embodiments, at least one of the one or more network devices 104-1, . . . , 104-N is a wired communications device that is compatible with at least one wired local area network (LAN) communications protocol, such as a wired router (e.g., an Ethernet router), a wired switch, a wired hub, or a wired bridge device (e.g., an Ethernet bridge). In some embodiments, at least one of the one or more network devices 104-1, . . . , 104-N is a wireless access point (AP) that connects to a local area network (e.g., a LAN) and/or to a backbone network (e.g., the Internet) through a wired connection and that wirelessly connects to wireless non-AP stations (STAs), for example, through one or more WLAN communications protocols, such as an IEEE 802.11 protocol.

In some embodiments, the network 150 includes at least one distribution switch (DS) or distribution layer switch that functions as a bridge between a core layer switch and an access layer switch, at least one head end (HE) or gateway, at least one access switch (AS) that can directly interact with a lower-level device (e.g., a wireless AP), at least one wireless AP, and/or at least one wireless sensor that wirelessly connects to a wireless AP. In some embodiments, at least one of the one or more network devices 104-1, . . . , 104-N is a wireless non-AP station (STA) that wirelessly connects to a wireless AP. For example, at least one of the one or more network devices 104-1, . . . , 104-N may be a laptop, a desktop personal computer (PC), a mobile phone, or other wireless device that supports at least one WLAN communications protocol (e.g., an IEEE 802.11 protocol)).

Figure 2:
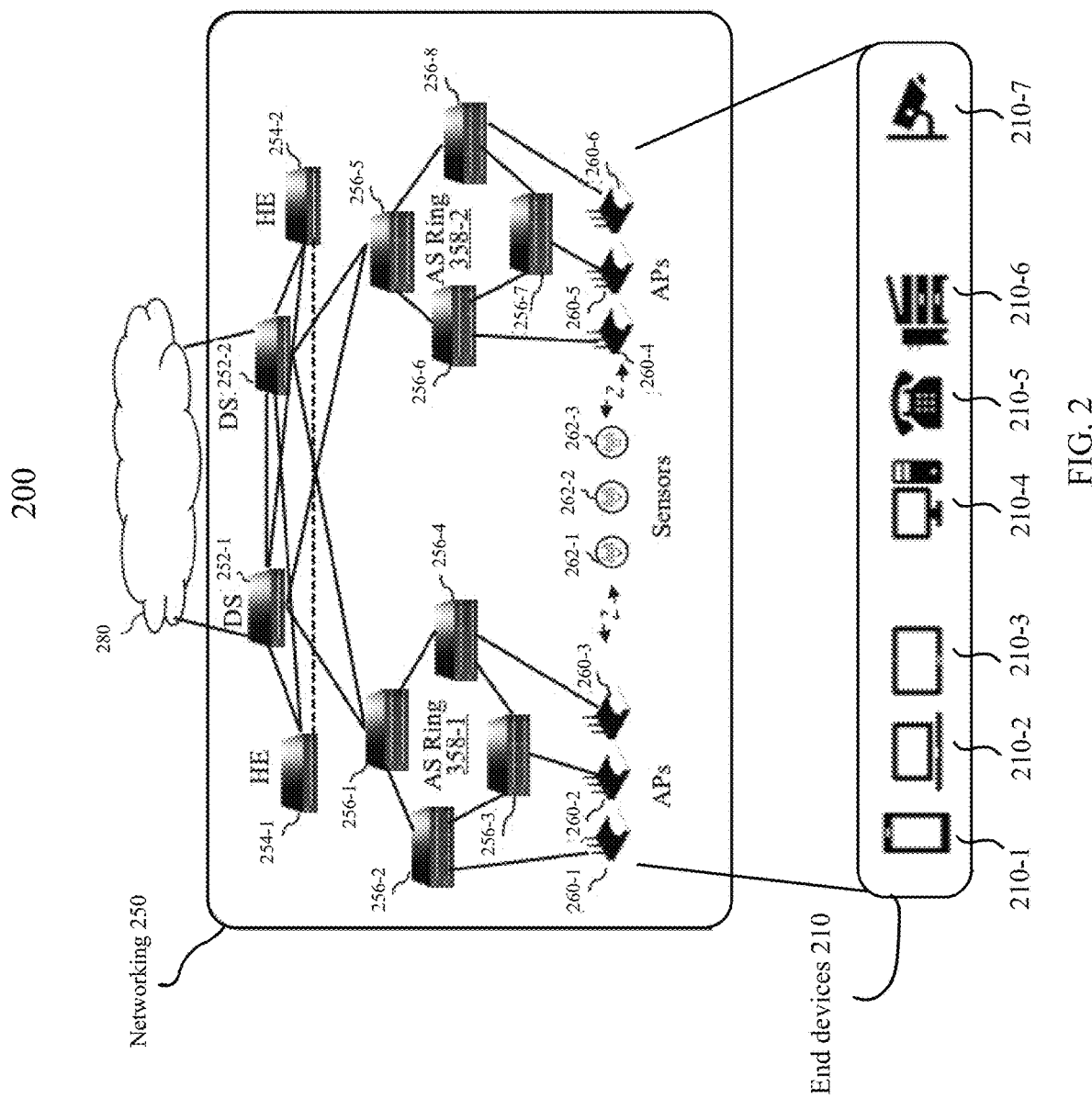
FIG. 2 depicts an example of a computer networking system.

FIG. 2 depicts an example of a computer networking system 200. In the embodiment of FIG. 2, the computer networking system 200 includes a network 250 that can be included in the communications system 100 depicted in FIG. 1. The network 250 depicted in FIG. 2 is an embodiment of the network 150 depicted in FIG. 1. However, the network 150 depicted in FIG. 1 is not limited to the embodiment depicted in FIG. 2. In some embodiments, the network 250 constitutes a network service block (NSB), which is a basic building block for providing connectivity as a service and is a replicable block that can be scaled (e.g., expanded) to meet any deployment.

In the embodiment depicted in FIG. 2, the network 250 includes software-based networking systems (referred to herein as networking systems), implemented as a pair of distribution switches (DSs) or distribution layer switches 252-1, 252-2 that are aggregation switches functioning as a bridge between core layer switches and access layer switches, a pair of head ends (HEs) or gateways 254-1, 254-2, a number of access switches (ASs) 256-1, 256-2, 256-3, 256-4, 256-5, 256-6, 256-7, 256-8 connected in rings 258-1, 258-2 that directly interact with lower level devices (e.g., wireless APs), a number of wireless APs 260-1, 260-2, 260-3, 260-4, 260-5, 260-6 connected to the ASs, and a number of wireless sensors 262-1, 262-2, 262-3 that wirelessly connect to the wireless APs. Other examples of networking systems may include a networking switch, a router, a wireless router, a wireless controller, a wireless gateway, etc. The DSs 252-1, 252-2 are connected to a network 280 (e.g., the Internet), which is connected to a network management system (e.g., the network management system 110 of the cloud server 102 depicted in FIG. 1).

The network 250 connects to end devices 210. For example, the wireless APs 260-1, 260-2, 260-3, 260-4, 260-5, 260-6 of the networking system connect to end devices 210-1, 210-2, 210-3, 210-4, 210-5, 210-6, 210-7. The end device 210-1 is a mobile phone, the end device 210-2 is a laptop, the end device 210-3 is a tablet, the end device 210-4 is a desktop, the end device 210-5 is an Internet of Things (IoT) home phone, the end device 210-6 is an IoT printer, and the end device 210-7 is an IoT camera. Other examples of end devices may include, but are not limited to, IoT sensors, badge access devices, wearables, etc.

Although the network 250 is shown with certain components and described with certain functionality herein, other embodiments of the network 250 may include fewer or more components to implement the same, less, or more functionality. For example, in some embodiments, the network 250 includes only one DS, more than two DSs, no HE, only one HE, more than two HEs, less than eight ASs, more than eight ASs, less than six wireless APs, more than six wireless APs, less than three wireless sensors, and/or more than three wireless sensors, and the end devices 210 includes less than seven end devices or more than seven end devices. In another example, although the network 250 shown in FIG. 2 as being connected in certain topology, the network topology of the network 250 is not limited to the topology shown in FIG. 2. In some embodiments, the number of HEs and DSs is constant in the network 250 while the number of the wireless APs, the aSs and the sensor(s) in the network 250 varies.

In some embodiments, when a change is made to a networking system (e.g., a networking system included in the network 250) of a computer networking system in a networking environment (e.g., an enterprise office, a retail store, a university, etc.), the success of the change is typically based on responses or metrics from the networking system(s) that received the change. However, a successful change may not imply that end devices affected by the change are operating the same as prior to the change being made. For example, the end devices that are connected and/or communicating with networking system(s) may experience performance degradation and/or a difference in experience after the change has been made. Consequently, the computer networking system may experience limited performance as it may not recognize that the change negatively affected the end devices and/or the networking system (s).

In accordance with an embodiment of the invention, a technique to validate a change in a computer networking system involves identifying, at a network management system, at least one candidate device, wherein a candidate device has a network connection to a device that is a target of the change in the computer networking system, collecting, at the network management system, metrics related to the at least one candidate device, triggering, by the network management system, the change at a target device, and validating, at the network management system, the change in the computer networking system using the metrics of the at least one candidate device. By validating the change using metrics related to candidate devices, computer networking systems are able to effectively identify change-related issues and improve overall performance.

Identifying candidate devices is an important step when validating a change in a computer networking system because it allows a network management system to determine how end devices that qualify as candidate devices perform before and after a change. End devices that qualify as candidate devices are often connected to a networking system, rarely disconnect from the networking system, and/or are stationary in nature (e.g., stationary devices) because when the networking system reboots or resets after a change, it is likely that the candidate devices will reconnect to the networking system and their performance can be checked (or monitored) after the change. If an end device is not expected to reconnect to the networking system after the change, then the end device may not qualify as a candidate device because a network management system would not be able to check its performance after the change. Comparing a performance of a candidate device after a change to a performance of the candidate before the change allows the network management system to perform an analysis and to validate whether the change was successful or unsuccessful. The validation may then be used to determine whether to reverse the change or leave the change in place.

In an embodiment, the processes of identifying candidate devices and validating a change in a computer networking system are automated as networking systems may undergo changes automatically and may have, for example, over 100 or 1000 end devices connected to them. In such an embodiment, it would be impractical to manually identify candidate devices and validate changes. Thus, candidacy and validation of a change may be rules-based processes that can then be automatically implemented by a network management system. As an example, the rules for candidacy and validation may be implemented in software code.

As described herein, a "change" may be defined as an update, altercation, adjustment, or revision to a target device (e.g., a networking system and/or an end device) included in a computer networking system. As described herein, a "target device" is a device that is a target of a change in a computer networking system (e.g., an HE, a DS, an AS, a wireless AP, an end device, or any combination thereof). Although certain examples and embodiments of a change are described herein, the change is not limited to such examples or embodiments.

In some embodiments, the change is an upgrade to a target device's (e.g., a networking system) software and/or a configurational change that alters the target device's operational behavior. In such an embodiment, alterations to the target device's operational behavior may alter responses from end devices that are connected to the target device. In some embodiments, the change is a part or system that is replaced with new units or restored to a prior form (e.g., via a return merchandise authorization (RMA)). In some embodiments, the change is swapping of an ethernet connection between two devices. In some embodiments, the change is a changing of an operating wireless channel of a wireless AP (not limited to Wi-Fi based APs).

As an example, the change can be a software upgrade. If software packages contained within a networking system move to the next version successfully and/or the networking system is deemed to be running properly, then the change is considered successful. In such an example, the change may also be a configurational change to the networking system which defines its operating parameters (e.g., operating speed, firewalls, bandwidth, etc.). As another example, the change can be a change to an IP address on an interface or a change to a VLAN on an interface. In such an example, the changes may be triggered at a wired ethernet networking switch. As another example, the change can be a change in a wireless channel on which an AP is operating, or a change to the configuration of a networking system that defines its operational behavior. In such an example, the change may be triggered at a wireless networking system that includes the AP and/or a wireless controller.

As described herein, a "candidate device" may be defined as an end device that has been determined to qualify as a candidate device. A candidate device has a network connection to a device that is a target of a change (e.g., a target device) in a computer networking system.

In an embodiment, identifying a candidate device involves polling, by a network management system, candidacy information of an end device included in a computer networking system, and determining, at the network management system, whether the end device qualifies as the candidate device using the candidacy information. Identifying candidate devices allows validation to be determined based on metrics from devices that are most likely to be connected to a target device and/or that are most likely to produce reliable (or stable) operating data (e.g., typical connection rate). An example of network management system operations for identifying a candidate device is described in further detail with reference to FIG. 3.

Figure 3:
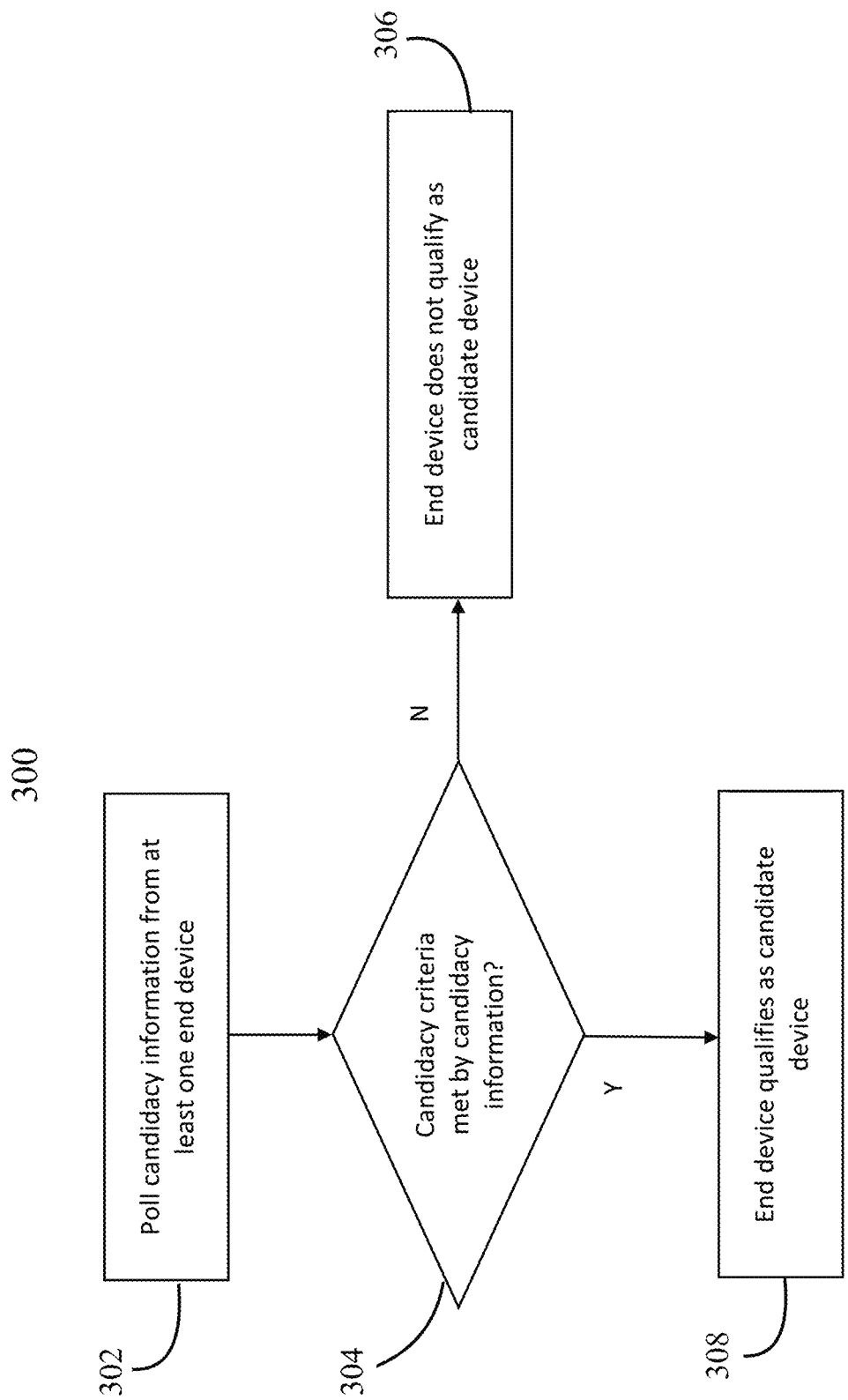
FIG. 3 is a process flow diagram of network management system operations for identifying candidate device(s).

FIG. 3 is a process flow diagram of network management system operations, 300, for identifying candidate device(s). At block 302, a network management system (not shown) polls candidacy information of at least one end device (not shown). As an example, the candidacy information may be reported by the at least one end device to a networking system, and polled from the networking system by the network management system. In such an example, the candidacy information may be metrics related to a connection and/or link between the end device and the networking system, and information about the types of end devices that connect to the networking system. Examples of the candidacy information may include a time of connection of the end device to the networking system, an uptime of a link between the end device and the networking system, a location of the end device, a fingerprint of the end device, and/or power consumption of the end device. Such examples are described in further detail herein.

The location of the end device may be in several forms. In one embodiment, the location is in the form of a number or a name of an interface on the networking system where the end device establishes its connection. For example, a device that connects over ethernet to a wired networking system on port 14 of a switch has a location of 14. In another embodiment, the location is in the form of a name of a wireless AP if the networking system includes a wireless interface that allows end devices to wirelessly connect. For example, in a wireless networking system consisting of a Wi-Fi based AP, an end device connected to the AP via a wireless connection may be assumed to be located near the AP (e.g., within a certain radius), thus providing a form of location. In yet another embodiment, the location is in the form of Global Positioning System (GPS) coordinates, or x, y coordinates based on a positioning system established by a computer networking system. For example, the computer networking system may compute a location of an end device by computing the end device's GPS location and/or x, y location on a predetermined floor map.

The fingerprint of the end device may include attributes related to the end device, such as the end device's type, power consumption, make, model, etc. As an example, an end device connecting to an ethernet LAN switch could be identified as a printer based on protocols (e.g., Link Layer Discover Protocol (LLDP)) that provide the end device Media Access Control (MAC) address (and Organizationally Unique Identifier (OUI)). Additionally, the end device type, make, and/or operating system may be identified using attributes snooped in the end device's Dynamic Host Configuration Protocol (DHCP) IP request packets and/or Hypertext Transfer Protocol (HTTP) agent in use by the end device.

The power consumption of the end device may indicate that the end device uses Power over Ethernet (PoE). As an example, if the end device uses PoE, wired LAN switches providing this functionality may be providing power to the end device to power on. In an embodiment, a network management system determines whether an end device is using PoE by polling a target device that has (or will) undergo a change. In such an embodiment, the target device responds by providing metrics (or statistics/information) to the network management system indicating that the end device is PoE capable.

Based on the candidacy information of the end devices, the network management system may determine whether candidacy criteria is met by the candidacy information (and whether the end device qualifies as a candidate device) at block 304. As an example, inferences regarding the end device may be made using a set of rules to filter certain end devices as candidate devices. In such an example, the rules that define candidacy may be tuned to meet the requirements of a given environment.

In one embodiment, if the candidacy information does not meet candidacy criteria (shown by "N"), then the end device does not qualify as the candidate device at block 306. In another embodiment, if the candidacy information meets the candidacy criteria (shown by "Y"), then the end device qualifies as the candidate device at block 308. In such an embodiment, the end devices that qualify as the candidate devices may be devices that have candidacy information indicating that the end device is typically present in a computer networking system. Such end devices are often connected to a networking system, rarely disconnect from the networking system, and/or are stationary in nature (e.g., stationary devices). Examples of stationary devices may include devices that are connected to a networking system via an ethernet cable (e.g., IoT sensors, printers, and/or security cameras), or other IoT devices that typically do not change locations. Embodiments and examples of end devices that qualify as candidate devices and that have candidacy information that meets candidacy criteria are described herein.

In one embodiment, the candidacy criteria is met if the end device has not been offline for more than an amount of time it takes for a networking system to reboot, such that the reboot is caused by a previous change to a target device (e.g., networking system) of a computer networking system. As an example, a networking system may take five minutes to reload/reboot and detect end devices as reconnected. In such an example, the networking system was rebooted due to a change on Jan. 1, 2022, at 1:00 A.M. EST, and was deemed as UP and running with the end device reconnected on Jan. 1, 2022, at 1:05 A.M. EST. If an end device has not disconnected and had not been offline from the networking system more than five minutes in the past several days since Jan. 1, 2022, at 1:05 A.M. EST, then the end device qualifies as a candidate device. In such an example, qualification may be computed from a networking system uptime, a last reboot or change date recorded, and/or an end device connected since time.

In another embodiment, the candidacy criteria is met if the end device has reconnected to a same interface after previous changes to a target device of a computer networking system. In yet another embodiment, the candidacy criteria is met if a location of the end device has not varied after previous changes to the computer networking system. As an example, if an end device reconnects to an ethernet LAN switch on a same interface port number post after previous changes, then the candidacy criteria is met. As another example, if a wireless end device has reconnected to a same wireless AP after previous changes, then the candidacy criteria is met. In such an example, if GPS and/or x, y coordinates of a location of the wireless end device have been reported to not vary within a predetermined range (e.g., within one meter or more than one meter) that deems the wireless end device to have reappeared or remained connected from the same location, then the candidacy criteria is met.

In yet another embodiment, the candidacy criteria is met if a fingerprint analysis determines that the end device is a stationary device.

In yet another embodiment, the candidacy criteria is met if a PoE budget allocated to a port of the at least one end device supports a predetermined PoE protocol. As an example, the PoE budget may be used to ensure that an end device reconnects to a same port after changes to a target device, is able to draw a same amount of power, and/or is successfully granted power.

Although embodiments and examples of end devices that qualify as candidate devices and have candidacy information that meets candidacy criteria are described with reference to specific examples, such embodiments are not limited to such examples. Additionally, a combination of embodiments and/or examples may be used to determine whether an end device qualifies as a candidate device. Using a combination of criterion for the candidacy criteria may enable varying levels of strictness when identifying candidate devices.

In some embodiments, if a network management system is unable to identify one or more end devices with candidacy information that meets candidacy criteria, and hence do not qualify as a candidate device, then the network management system may then determine which end devices best qualify as candidate devices. As an example, end devices that best qualify as candidate devices may be end devices with candidacy information that meets a predetermined threshold (e.g., 50% or more) of the candidacy criteria. In such an example, the predetermined threshold of the candidacy criteria may be changed to enable varying levels of strictness when identifying candidate devices.

Identifying candidate devices is an important step when validating a change in a computer networking system because it helps establish a baseline of what end devices connect to a networking system, and how such end devices typically perform. By using certain characteristics (e.g., candidacy information) from end devices to identify candidate devices, validation of a change may be more reliable because the validation is performed using metrics from devices that are likely to reconnect to the networking system after the change. Such devices provide a good indication of a successful or unsuccessful validation because a network management system is able to compare their post-change metrics to their pre-change metrics. If, for example, end devices that intermittently connect and use the networking system were identified as candidate devices, then validation of the change may be unreliable because such devices may not always reconnect to the networking system after the change has been made. As such, the network management system would not be able to compare their post-change metrics to their pre-change metrics.

After identifying at least one candidate device, a network management system may communicate with at least one target device that communicates with the at least one candidate device to validate a change in a computer networking system. An example of such communications is described in further detail with reference to FIG. 4.

Figure 4:
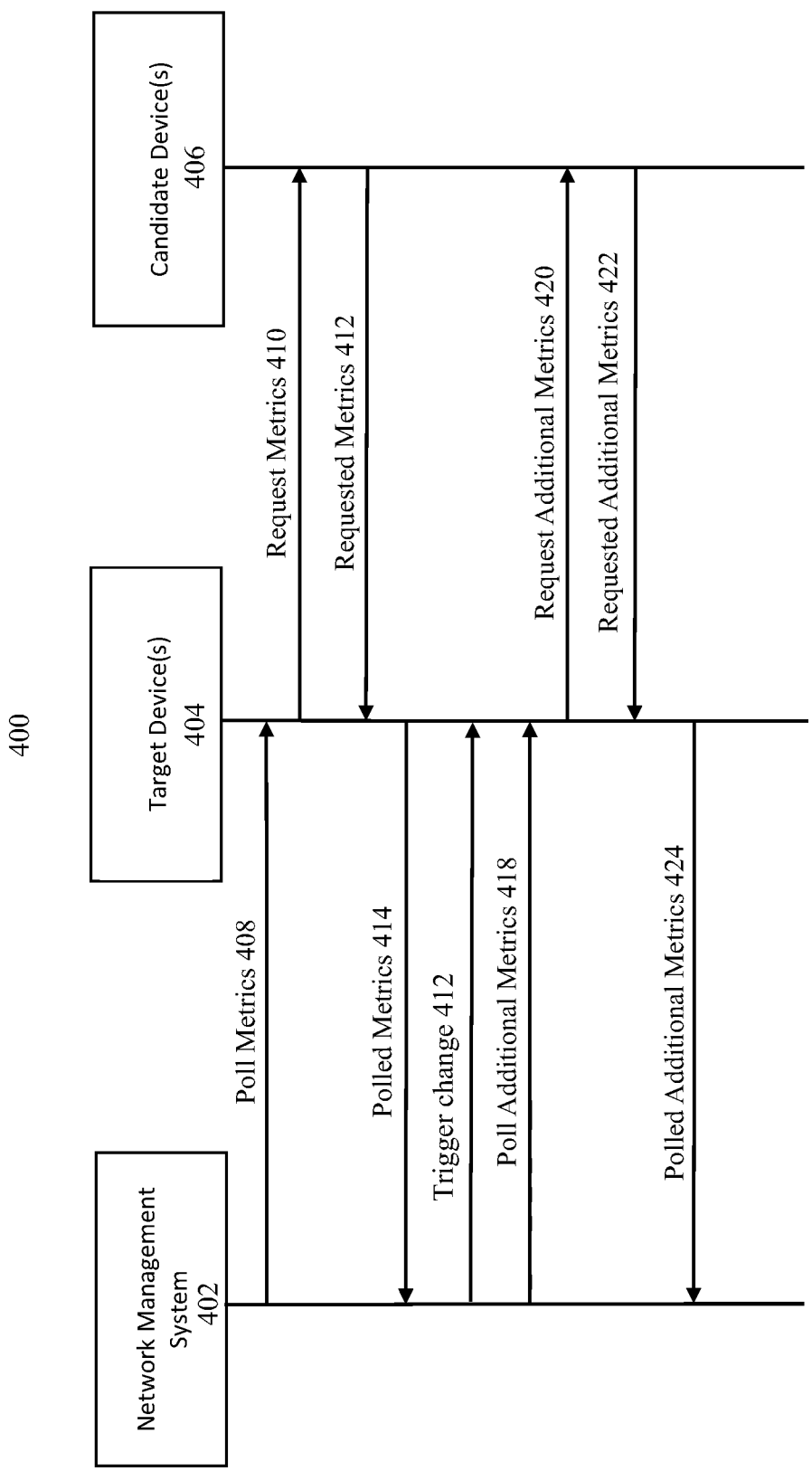
FIG. 4 illustrates communications in a computer networking system to validate a change in a computer networking system.

FIG. 4 illustrates communications, 400, in a computer networking system to validate a change in the computer networking system. In the embodiment of FIG. 4, the computer networking system includes a network management system 402, at least one target device, implemented as target device(s) 404, and at least one candidate device, implemented as candidate device(s) 406. The network management system 402, the target device(s) 404, and the candidate device(s) 406 may communicate via wireless communications, via non-wireless communications, or via a combination thereof. Additionally, network management system 402, the target device(s) 404, and the candidate device(s) 406 may each have software code that is able to execute their respective operations.

To validate the change in the computer networking system, the network management system 402 may need to establish a baseline of "performance" and/or "behavior" of the candidate device(s) 406. An example of such performance and/or behavior may be the candidate device(s) (e.g., an IoT device) sending clicks to the target device(s) 404 (e.g., a centralized server) every five seconds, such that the performance and/or the behavior of the candidate device(s) may be viewed as the baseline. The baseline of the candidate device(s) may be determined before a change is triggered in the computer networking system and may be determined by collecting metrics (e.g., pre-change metrics) related to the candidate device(s).

The network management system 402 collects metrics related to the candidate device(s) 406 by polling the metrics from the target device(s) 404. As an example, the metrics may be collected days, hours, minutes, seconds, etc., before a change. In an embodiment, the network management system 402 polls the metrics from the target device(s) 404 by transmitting a poll metrics message 408 to the target device(s) 404. In such an embodiment, the poll metrics message 408 indicates the metrics polled by the network management system 402. In response to receiving the poll metrics message 408, the target device(s) 404 transmit a request metrics message 410 to the candidate device(s) 406 that requests the metrics polled by the network management system 402. The candidate device(s) 406 then transmit the requested metrics to the target device(s) 404 via a requested metrics message 412. Once the target device(s) have received the metrics from the candidate device(s) 406, a polled metrics message 414 that includes the polled metrics is transmitted to the network management system 402.

Although the network management system collects metrics related to the candidate device(s) by polling the metrics from the target device(s), the network management system may also collect the metrics by polling the candidate device (s) (not shown). Additionally, in some embodiments, the candidate device(s) may transmit metrics to the target device (s) without receiving a request (not shown). For example, metrics related to the at least one candidate device may be polled by the target device(s) at preset time intervals (e.g., every five seconds, every minute, every hour, etc.), or on-demand (initiated by a user). In such an example, the target device(s) may store the metrics so that the metrics are readily available when polled by a network management system.

As described herein, "metrics" and/or "additional metrics" may be defined as information (e.g., operational information, communication information, configurational information, etc.) that is related to at least one target device, at least one candidate device, or both. The metrics and/or the additional metrics may be stored at the network management system. In some embodiments, the network management system may determine what metrics will provide a measure of the candidate device(s) performance, such that the metrics may be tuned to particular environments and/or classes of candidate devices. Examples of the metrics may include information that determines whether candidate device(s) reconnected to target device(s) (e.g., via link status), candidate device locations at reconnection events, candidate device traffic patterns, a candidate device's packets per second behavior, and/or a candidate device's power consumption over PoE. Such examples are described in further detail herein, however the metrics are not limited to such examples.

Information that determines whether the candidate device (s) 406 reconnected to the target device(s) 404 may be a first metric checked by the network management system 402. As an example, the network management system polls metrics that determine whether the candidate device(s) are connected to the target device(s) (e.g., an indicator of the candidate device(s) link status). In such an example, after a change is triggered by the network management system, the network management system polls additional metrics that determine whether the candidate device(s) reconnected to the target device(s).

The candidate device locations at reconnection events allows the network management system 402 to determine whether the candidate device(s) 406 connects back at the same or similar location at each reconnection event historically. For example, the network management system could check as far back in time as is reasonable for a certain case and environment, and may check to see whether the candidate device is connecting back on the same interface (e.g., wired interface or wireless interface) of a networking system.

The candidate device traffic patterns allows the network management system to determine bytes uploaded and/or downloaded, for example, within a certain time duration and/or at a regular interval. As an example, the network management system 402 could check the candidate device (s) 406 for a traffic pattern of "x" bytes uploaded and "y" bytes downloaded within a time window of "t" seconds, at a regular interval of "z" seconds/mins, where x, y, t, and z are positive integers.

The candidate device's packets per second behavior allows the network management system 402 to check, for example, the candidate device(s) 406 traffic pattern of "p" packets per second, where p is a positive integer.

The candidate device's power consumption over PoE allows the network management system 402 to check (if applicable), for example, whether the candidate device(s) 406 consume or draw the same PoE as historically observed.

Once the network management system 402 has collected the metrics related to the candidate device(s) 406, the network management system 402 triggers a change at the target device(s) 404. In an embodiment, the network management system 402 triggers the change by transmitting a trigger change message 416 to the target device(s) 404. The trigger change message 416 may carry information indicating the change to be implemented by the target device(s) 404. As such, when the target device(s) 404 receive the trigger change message 416, the target device(s) process and implement (or execute) the change. In some embodiments, the change triggered by the network management system 402 may cause the target device(s) 404 and/or the candidate device(s) 406 to reboot, such that the candidate device(s) may need to reconnect to the target device(s) 404.

The network management system 402 then collects additional metrics (e.g., post-change metrics) related to the candidate device(s) 406 after the change is triggered at the target device(s) 404. As an example, the additional metrics may be collected immediately after the change, seconds after the change, minutes after the change, etc. The network management system 402 collects the additional metrics by polling the additional metrics from the target device(s) 404. In an embodiment, the network management system 402 polls the additional metrics from target device(s) 404 by transmitting a poll additional metrics message 418 to the target device(s) 404. In such an embodiment, the poll additional metrics message 418 indicates the additional metrics polled by the network management system 402, such that the additional metrics may be the same or similar to the metrics collected before the change was triggered. After receiving the poll additional metrics message 418, the target device(s) 404 transmit a request additional metrics message 420 to the candidate device(s) 406 that requests the additional metrics polled by the network management system 402. The candidate device(s) 406 then transmit the requested additional metrics to the target device(s) 404 via a requested additional metrics message 422. The target device(s) 404 then transmit a polled additional metrics message 424 to the network management system 402 after receiving the additional metrics from the candidate device(s) 406.

In some embodiments, the network management system 402 may poll additional metrics that determine whether the candidate device(s) 406 reconnected to the target device(s) 404. In such an embodiment, the network management system may be configured and/or programmed with such a capability, for example, via a code included in a validation engine. Additionally, in such an embodiment, polling metrics that determine whether the candidate device(s) reconnected to the target device(s) may be a first check of a post-change validation process.

As an example, the network management system may determine whether the candidate device(s) reconnected to the target device(s) by polling metrics on the target device(s) that underwent change. The metrics on the target device(s)

that underwent change may be, for example, an indicator of the candidate device(s) link status. As an example, the link status may be indicated by a "port up" indication for a wired candidate device or an "associated" indication for a wireless candidate device, and may indicate whether a link between the candidate device(s) and the target device(s) is active (e.g., used to exchange data). Additionally, a MAC address and/or additional attributes related to the link status (e.g., a hostname) of the candidate device(s) may be checked to determine whether the target device(s) report the candidate device(s) as connected (post-change). If the network management system determines that the candidate device(s) reconnected to the target device(s), then the network management system may proceed to poll other additional metrics. If the network management system determines that some or all of the candidate device(s) did not reconnect to the target device(s), then the network management system may proceed to reverse the change and/or poll other additional metrics from the candidate device(s) that reconnected to the target device(s).

Although the network management system collects additional metrics related to the candidate device(s) by polling the additional metrics from the target device(s), the network management system may also collect the additional metrics by polling the candidate device(s) (not shown). Additionally, in some embodiments, the candidate device(s) may transmit additional metrics to the target device(s) without receiving a request (not shown). For example, additional metrics related to the at least one candidate device may be polled by the target device(s) at preset time intervals (e.g., every five seconds, every minute, every hour, etc.), or on-demand (initiated by a user). In such an example, the target device(s) may store the additional metrics so that the metrics are readily available when polled by a network management system.

Although not shown, after the network management system 402 has collected the additional metrics related to the candidate device(s) 406, the network management system may proceed to validate the change in the computer networking system. As described herein, "validating" may be defined as a process during which a change in a computer networking system is reviewed, analyzed, and/or determined to be successful or unsuccessful. An example of network management system operations for validating a change in a computer networking system is described in further detail with reference to FIG. 5.

Figure 5:
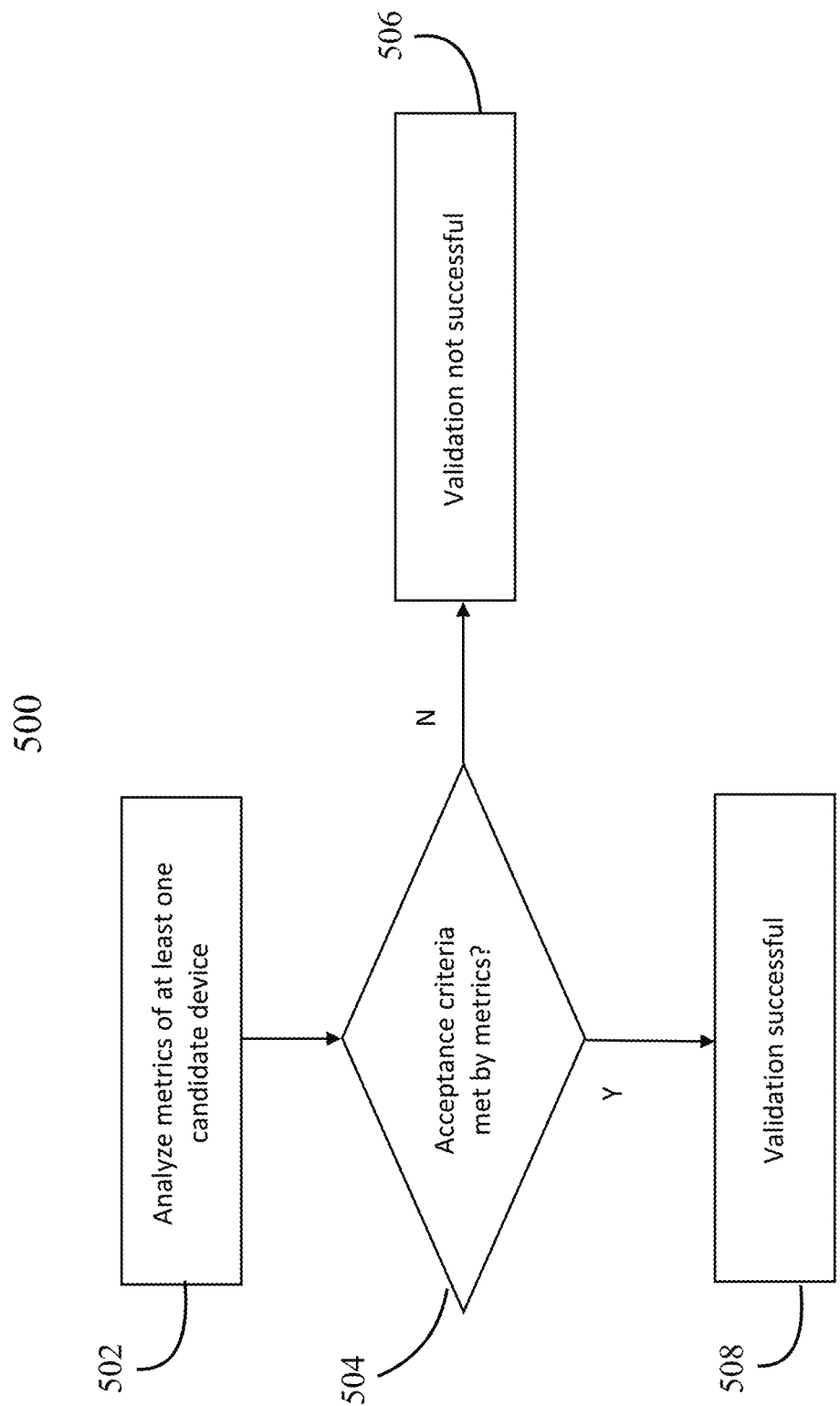
FIG. 5 is a process flow diagram of network management system operations for validating a change in a computer networking system.

FIG. 5 is a process flow diagram of network management system operations, 500, for validating a change in a computer networking system. At block 502, a network management system (not shown) analyzes metrics of at least one candidate device. In an embodiment, analyzing the metrics may involve comparing pre-change metrics (e.g., metrics collected before a change) to post-change metrics (e.g., additional metrics collected after the change). The pre-change metrics may be historical data that was collected, for example, days, hours, minutes, or seconds before a change, and the post-change metrics may be data that was collected shortly after the change (e.g., immediately after, seconds after, minutes after, etc.). The comparison may be used to seek out discrepancies and/or differences of the post-change metrics in relation to the pre-change metrics that may indicate a change in performance.

At block 504, the network management system determines whether acceptance criteria is met by the metrics. In an embodiment, the acceptance criteria specifies what variance beyond which post-change data related to the candidate device(s) is considered "change beyond reasonable" (e.g., change beyond a predetermined standard deviation).

In one embodiment, if the metrics do not meet the acceptance criteria (shown by "N"), then a validation of the change is not successful at block 506. As an example, if acceptance criteria is not met (e.g., a discrepancy is seen), then the network management system may draw an inference that the candidate device and/or the target device did not return back to a same or reasonably acceptable level of performance as prior to the change. If the validation of the change is not successful, then the change may be reversed. For example, the network management system may choose to roll back the change to a target device to restore the computer networking system to a previous state (if reasonable to do so).

In another embodiment, if the metrics meet the acceptance criteria (shown by "Y"), then the validation of the change is successful at block 508. As an example, if acceptance criteria is met (e.g., no discrepancies are seen), then the network management system may draw an inference that the candidate device and/or target device returned to a same or reasonable acceptable level of performance as prior to the change. If the validation of the change is successful, then the change may be left in place.

Further embodiments and examples of acceptance criteria are described herein.

In an embodiment, the acceptance criteria is defined by a predetermined threshold of candidate devices reconnecting to a networking system of the computer networking system after the change, such that the validation is successful if the predetermined threshold of candidate devices reconnect to the networking system after the change. For example, if X out of Y candidate devices successfully reconnect to the networking system, then the validation of the change is successful. In such an example, X is a threshold of acceptance, X and Y are positive integers, and X can be equal to Y.

In another embodiment, the acceptance criteria is defined by a predetermined threshold of candidate devices exhibiting a post-change level of data usage that is within a predetermined range of a pre-change level of data usage, such that the validation is successful if the predetermined threshold of candidate devices exhibit the post-change level of data usage that is within the predetermined range of the pre-change level of data usage. For example, if M out of X candidate devices (e.g., 95 of 100 candidate devices) exhibited a same or similar level of data usage as a baseline usage recorded prior to a change to a networking system, then the validation of the change is successful. In such an example, M is a threshold of acceptance and could be equal to X depending on a level of strictness desired.

In yet another embodiment, the acceptance criteria is defined by a predetermined threshold of candidate devices exhibiting a post-change level of power usage that is within a predetermined range of a pre-change level of power usage, such that the validation is successful if the predetermined threshold of candidate devices exhibit the post-change level of power usage that is within the predetermined range of the pre-change level of power usage. For example, ethernet wired candidate devices may depend on a networking system to provide power (and to start operating), so the networking system should exhibit the same or similar level of power consumption as a baseline before the change to the computer networking system.

An example case that implements operations and communications as described with reference to FIGS. 3-5 is described herein.

To validate a change in a computer networking system, a network management system may run an analysis to identify candidate devices to run a baseline against. After identifying the candidate devices, the network management system collects a "snapshot" (metrics) of the candidate devices expected to come back online and operate post-change.

As an example, the snapshot may include a candidate device's name, type, and/or MAC address, an interface port number and/or name where the candidate device is connected (if candidate device is non-wireless), and/or AP names and Service Set Identifier (SSID) where the candidate device is connected (if candidate device is wireless). The interface port number and/or the name where the candidate device is connected may also include power being requested and/or power being allocated (e.g., for IP phones and other PoE drawing devices). The AP names and the SSID where the candidate devices may also include transmission (Tx) and/or reception (Rx) counter or megabits per second (Mbps) up or down (aggregate for 15 minutes prior to a time of the snapshot). The Tx/Rx counter and/or the Mbps up/down may be used to confirm that a data path of the candidate devices was performing without interruption prior the snapshot, such that a table may show per minute Tx/Rx Mbps (and incrementing values for healthy states).

After the snapshot, the network management system may trigger a change at a networking system (e.g., target device) included in the computer networking system. After the change has been implemented, the network management system may collect another snapshot of the candidate devices. The network management system then runs an analysis to compare the two snapshots from before and after the change was triggered. The analysis involves checking whether the information included in the snapshots meet pre-change and post-change acceptance criteria defined by the network management system. If the acceptance criteria is met, then the validation is successful. If the acceptance criteria is not met, then the validation is unsuccessful.

Figure 6:
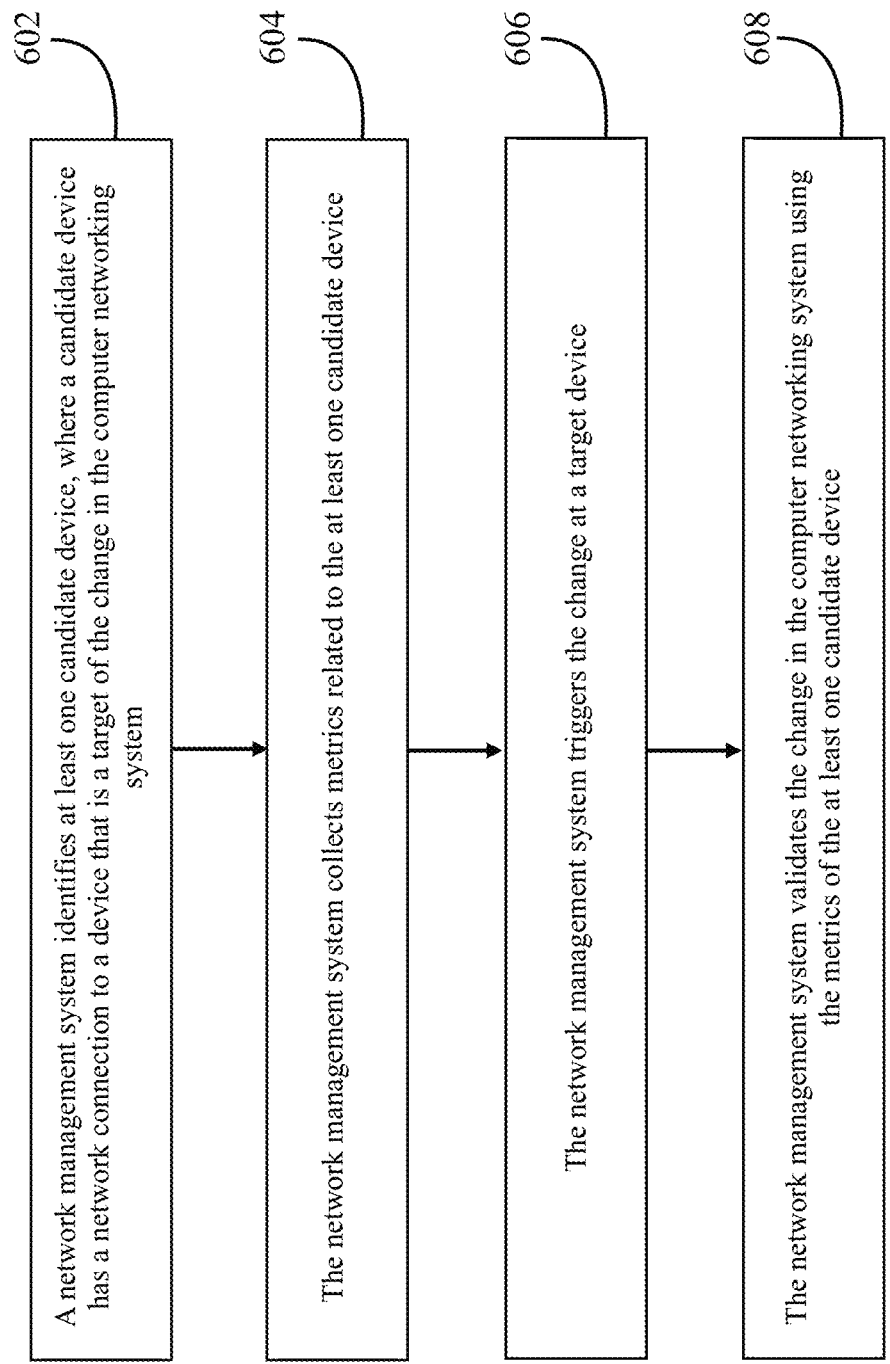
FIG. 6 is a process flow diagram of a method to validate a change in a computer networking system.

FIG. 6 is a process flow diagram of a method to validate a change in a computer networking system. At block 602, a network management system identifies at least one candidate device, where a candidate device has a network connection to a device that is a target of the change in the computer networking system. At block 604, the network management system collects metrics related to the at least one candidate device. At block 606, the network management system triggers the change at a target device. At block 608, the network management system validates the change in the computer networking system using the metrics of the at least one candidate device.

In some embodiments, a technique to validate a change in a computer networking system involves identifying, at a network management system, at least one candidate device, where a candidate device has a network connection to a device that is a target of the change in the computer networking system, collecting, at the network management system, a first set of metrics related to the at least one candidate device, triggering, by the network management system, the change at a target device, collecting, at the network management system, a second set of metrics related to the at least one candidate device, and validating, at the network management system, the change in the computer networking system using the first set of metrics and the second set of metrics.

In some embodiments, the techniques to validate a change in a computer networking system may be implemented by a system (e.g., a computer networking system). For example, a computer networking system may include a network management system configured to identify at least one candidate device, where a candidate device has a network connection to a device that is a target of the change in the computer networking system, collect metrics related to the at least one candidate device, trigger the change at a target device, and validate the change in the computer networking system using the metrics of the at least one candidate device.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer. As an example, an embodiment of a computer program product includes a computer useable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid-state memory, magnetic tape, a removable computer diskette, a random-access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Alternatively, embodiments of the invention may be implemented entirely in hardware or in an implementation containing both hardware and software elements. In embodiments which use software, the software may include but is not limited to firmware, resident software, microcode, etc.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method to validate a change in a computer networking system, the method comprising:
   identifying, at a network management system, at least one candidate device, wherein a candidate device has a network connection to a device that is a target of the change in the computer networking system;
   collecting, at the network management system, metrics related to the at least one candidate device;
   triggering, by the network management system, the change at a target device; and
   validating, at the network management system, the change in the computer networking system using the metrics of the at least one candidate device,
   wherein collecting, at the network management system, the metrics related to the at least one candidate device comprises:
   at the network management system, transmitting a poll metrics message to the target device, wherein a request metrics message is transmitted from the target device to the at least one candidate device in response to receiving the poll metrics message, and wherein a plurality of requested metrics are transmitted from the at least one candidate device to the target device via a requested metrics message; and at the network management system, receiving a polled metrics message that includes the requested metrics from the target device, wherein identifying the at least one candidate device involves:

polling, by the network management system, candidacy information of at least one end device included in the computer networking system; and determining, at the network management system, whether the at least one end device qualifies as the at least one candidate device using the candidacy information, wherein the at least one end device qualifies as the at least one candidate device if the at least one end device has not been offline for more than an amount of time it takes for a networking system to reboot, and wherein the reboot is caused by a previous change to the computer networking system.

2. The method of claim 1, wherein the at least one end device does not qualify as the at least one candidate device if the candidacy information does not meet candidacy criteria.

3. The method of claim 1, wherein the candidacy information includes at least one of:
a time of connection of the end device to a networking system;
an uptime of a link between the end device and the networking system;
a location of the end device;
a fingerprint of the end device; and
power consumption of the end device.

4. The method of claim 1, wherein the method involves:
collecting, at the network management system, additional metrics related to the at least one candidate device after the change is triggered at the target device.

5. The method of claim 1, wherein the method involves:
collecting, at the network management system, additional metrics related to the at least one candidate device after the change is triggered at the target device; and
wherein validating the change in the computer networking system involves:
determining, at the network management system, whether acceptance criteria is met by comparing the metrics collected before the change and the additional metrics collected after the change.

6. The method of claim 1, wherein the validation is successful if a predetermined threshold of candidate devices reconnect to the computer networking system after the change.

7. The method of claim 1, wherein the validation is successful if a predetermined threshold of candidate devices exhibit a post-change level of data usage that is within a predetermined range of a pre-change level of data usage.

8. The method of claim 1, wherein the validation is successful if a predetermined threshold of candidate devices exhibit a post-change level of power usage that is within a predetermined range of a pre-change level of power usage.

9. The method of claim 1, wherein the method involves leaving the change in place if the validation is successful.

10. The method of claim 1, wherein the method involves reversing the change if the validation is not successful.

11. The method of claim 1, wherein the metrics related to the at least one candidate device are collected by the network management system at preset time intervals.

12. A system comprising:
a network management system configured to:
identify at least one candidate device, wherein a candidate device has a network connection to a device that is a target of a change in a computer networking system;
collect metrics related to the at least one candidate device;
trigger the change at a target device; and
validate the change in the computer networking system using the metrics of the at least one candidate device,
wherein the network management system is further configured to transmit a poll metrics message to the target device, wherein a request metrics message is transmitted from the target device to the at least one candidate device in response to receiving the poll metrics message, wherein a plurality of requested metrics are transmitted from the at least one candidate device to the target device via a requested metrics message, wherein the network management system is further configured to receive a polled metrics message that includes the requested metrics from the target device, wherein the network management system is further configured to collect additional metrics related to the at least one candidate device after the change is triggered at the target device and to determine whether acceptance criteria is met by comparing the metrics collected before the change and the additional metrics collected after the change, and wherein the system is implemented using at least one processor.

13. A method to validate a change in a computer networking system, the method comprising:
identifying, at a network management system, at least one candidate device, wherein a candidate device has a network connection to a device that is a target of the change in the computer networking system;
collecting, at the network management system, metrics related to the at least one candidate device;
triggering, by the network management system, the change at a target device; and
validating, at the network management system, the change in the computer networking system using the metrics of the at least one candidate device, wherein collecting, at the network management system, the metrics related to the at least one candidate device comprises:
at the network management system, transmitting a poll metrics message to the target device, wherein a request metrics message is transmitted from the target device to the at least one candidate device in response to receiving the poll metrics message, and wherein a plurality of requested metrics are transmitted from the at least one candidate device to the target device via a requested metrics message; and
at the network management system, receiving a polled metrics message that includes the requested metrics from the target device, wherein identifying the at least one candidate device involves:

polling, by the network management system, candidacy information of at least one end device included in the computer networking system; and determining, at the network management system, whether the at least one end device qualifies as the at least one candidate device using the candidacy information, wherein the at least one end device qualifies as the at least one candidate device if the at least one end device has reconnected to a same interface after previous changes to the computer networking system.

14. A method to validate a change in a computer networking system, the method comprising:
    identifying, at a network management system, at least one candidate device, wherein a candidate device has a network connection to a device that is a target of the change in the computer networking system;
    collecting, at the network management system, metrics related to the at least one candidate device;
    triggering, by the network management system, the change at a target device; and
    validating, at the network management system, the change in the computer networking system using the metrics of the at least one candidate device,
    wherein collecting, at the network management system, the metrics related to the at least one candidate device comprises:
    at the network management system, transmitting a poll metrics message to the target device, wherein a request metrics message is transmitted from the target device to the at least one candidate device in response to receiving the poll metrics message, and wherein a plurality of requested metrics are transmitted from the at least one candidate device to the target device via a requested metrics message; and
    at the network management system, receiving a polled metrics message that includes the requested metrics from the target device,
    wherein identifying the at least one candidate device involves:
      polling, by the network management system, candidacy information of at least one end device included in the computer networking system; and
      determining, at the network management system, whether the at least one end device qualifies as the at least one candidate device using the candidacy information, wherein the at least one end device qualifies as the at least one candidate device if a location of the at least one end device has not varied after previous changes to the computer networking system.

15. A method to validate a change in a computer networking system, the method comprising:
    identifying, at a network management system, at least one candidate device, wherein a candidate device has a network connection to a device that is a target of the change in the computer networking system;
    collecting, at the network management system, metrics related to the at least one candidate device;
    triggering, by the network management system, the change at a target device; and
    validating, at the network management system, the change in the computer networking system using the metrics of the at least one candidate device,
    wherein collecting, at the network management system, the metrics related to the at least one candidate device comprises:
    at the network management system, transmitting a poll metrics message to the target device, wherein a request metrics message is transmitted from the target device to the at least one candidate device in response to receiving the poll metrics message, and wherein a plurality of requested metrics are transmitted from the at least one candidate device to the target device via a requested metrics message; and
    at the network management system, receiving a polled metrics message that includes the requested metrics from the target device,
    wherein identifying the at least one candidate device involves:
      polling, by the network management system, candidacy information of at least one end device included in the computer networking system; and
      determining, at the network management system, whether the at least one end device qualifies as the at least one candidate device using the candidacy information, wherein the at least one end device qualifies as the at least one candidate device if a fingerprint analysis determines that the at least one end device is a stationary device.

16. A method to validate a change in a computer networking system, the method comprising:
    identifying, at a network management system, at least one candidate device, wherein a candidate device has a network connection to a device that is a target of the change in the computer networking system;
    collecting, at the network management system, metrics related to the at least one candidate device;
    triggering, by the network management system, the change at a target device; and
    validating, at the network management system, the change in the computer networking system using the metrics of the at least one candidate device,
    wherein collecting, at the network management system, the metrics related to the at least one candidate device comprises:
    at the network management system, transmitting a poll metrics message to the target device, wherein a request metrics message is transmitted from the target device to the at least one candidate device in response to receiving the poll metrics message, and wherein a plurality of requested metrics are transmitted from the at least one candidate device to the target device via a requested metrics message; and
    at the network management system, receiving a polled metrics message that includes the requested metrics from the target device,
    wherein identifying the at least one candidate device involves:
      polling, by the network management system, candidacy information of at least one end device included in the computer networking system; and
      determining, at the network management system, whether the at least one end device qualifies as the at least one candidate device using the candidacy information, wherein the at least one end device qualifies as the at least one candidate device if a Power over Ethernet (PoE) budget allocated to a port of the at least one end device supports a predetermined PoE protocol.

17. A method to validate a change in a computer networking system, the method comprising:
    identifying, at a network management system, at least one candidate device, wherein a candidate device has a network connection to a device that is a target of the change in the computer networking system;
    collecting, at the network management system, metrics related to the at least one candidate device;
    triggering, by the network management system, the change at a target device; and
    validating, at the network management system, the change in the computer networking system using the metrics of the at least one candidate device, wherein collecting, at the network management system, the metrics related to the at least one candidate device comprises:
  at the network management system, transmitting a poll metrics message to the target device, wherein a request metrics message is transmitted from the target device to the at least one candidate device in response to receiving the poll metrics message, and wherein a plurality of requested metrics are transmitted from the at least one candidate device to the target device via a requested metrics message; and
  at the network management system, receiving a polled metrics message that includes the requested metrics from the target device,
wherein the method involves:
  collecting, at the network management system, additional metrics related to the at least one candidate device after the change is triggered at the target device; and
  wherein validating the change in the computer networking system involves:
    determining, at the network management system, whether acceptance criteria is met by comparing the metrics collected before the change and the additional metrics collected after the change.

18. A method to validate a change in a computer networking system, the method comprising:
  identifying, at a network management system, at least one candidate device, wherein a candidate device has a network connection to a device that is a target of the change in the computer networking system;
  collecting, at the network management system, metrics related to the at least one candidate device;
  triggering, by the network management system, the change at a target device; and
  validating, at the network management system, the change in the computer networking system using the metrics of the at least one candidate device,
  wherein collecting, at the network management system, the metrics related to the at least one candidate device comprises:
    at the network management system, transmitting a poll metrics message to the target device, wherein a request metrics message is transmitted from the target device to the at least one candidate device in response to receiving the poll metrics message, and wherein a plurality of requested metrics are transmitted from the at least one candidate device to the target device via a requested metrics message; and
    at the network management system, receiving a polled metrics message that includes the requested metrics from the target device,
  wherein the validation is successful if a predetermined threshold of candidate devices reconnect to the computer networking system after the change.

19. A method to validate a change in a computer networking system, the method comprising:
  identifying, at a network management system, at least one candidate device, wherein a candidate device has a network connection to a device that is a target of the change in the computer networking system;
  collecting, at the network management system, metrics related to the at least one candidate device;
  triggering, by the network management system, the change at a target device; and
  validating, at the network management system, the change in the computer networking system using the metrics of the at least one candidate device,
  wherein collecting, at the network management system, the metrics related to the at least one candidate device comprises:
    at the network management system, transmitting a poll metrics message to the target device, wherein a request metrics message is transmitted from the target device to the at least one candidate device in response to receiving the poll metrics message, and wherein a plurality of requested metrics are transmitted from the at least one candidate device to the target device via a requested metrics message; and
    at the network management system, receiving a polled metrics message that includes the requested metrics from the target device,
  wherein the validation is successful if a predetermined threshold of candidate devices exhibit a post-change level of data usage that is within a predetermined range of a pre-change level of data usage.

20. A method to validate a change in a computer networking system, the method comprising:
  identifying, at a network management system, at least one candidate device, wherein a candidate device has a network connection to a device that is a target of the change in the computer networking system;
  collecting, at the network management system, metrics related to the at least one candidate device;
  triggering, by the network management system, the change at a target device; and
  validating, at the network management system, the change in the computer networking system using the metrics of the at least one candidate device,
  wherein collecting, at the network management system, the metrics related to the at least one candidate device comprises:
    at the network management system, transmitting a poll metrics message to the target device, wherein a request metrics message is transmitted from the target device to the at least one candidate device in response to receiving the poll metrics message, and wherein a plurality of requested metrics are transmitted from the at least one candidate device to the target device via a requested metrics message; and
    at the network management system, receiving a polled metrics message that includes the requested metrics from the target device,
  wherein the validation is successful if a predetermined threshold of candidate devices exhibit a post-change level of power usage that is within a predetermined range of a pre-change level of power usage.

21. A system comprising:
  a network management system configured to:
    identify at least one candidate device, wherein a candidate device has a network connection to a device that is a target of a change in a computer networking system;
    collect metrics related to the at least one candidate device;
    trigger the change at a target device; and
    validate the change in the computer networking system using the metrics of the at least one candidate device,
    wherein the network management system is further configured to transmit a poll metrics message to the target device, wherein a request metrics message is transmitted from the target device to the at least one candidate device in response to receiving the poll metrics message, wherein a plurality of requested metrics are transmitted from the at least one candidate device to the target device via a requested metrics message, wherein the network management system is further configured to receive a polled metrics message that includes the requested metrics from the target device, wherein the validation is successful if a predetermined threshold of candidate devices reconnect to the computer networking system after the change, and wherein the system is implemented using at least one processor.

22. A system comprising:
a network management system configured to:
  identify at least one candidate device, wherein a candidate device has a network connection to a device that is a target of a change in a computer networking system;
  collect metrics related to the at least one candidate device;
  trigger the change at a target device; and
  validate the change in the computer networking system using the metrics of the at least one candidate device,
  wherein the network management system is further configured to transmit a poll metrics message to the target device, wherein a request metrics message is transmitted from the target device to the at least one candidate device in response to receiving the poll metrics message, wherein a plurality of requested metrics are transmitted from the at least one candidate device to the target device via a requested metrics message, wherein the network management system is further configured to receive a polled metrics message that includes the requested metrics from the target device, wherein the validation is successful if a predetermined threshold of candidate devices exhibit a post-change level of data usage that is within a predetermined range of a pre-change level of data usage, and wherein the system is implemented using at least one processor.

23. A system comprising:
a network management system configured to:
  identify at least one candidate device, wherein a candidate device has a network connection to a device that is a target of a change in a computer networking system;
  collect metrics related to the at least one candidate device;
  trigger the change at a target device; and
  validate the change in the computer networking system using the metrics of the at least one candidate device,
  wherein the network management system is further configured to transmit a poll metrics message to the target device, wherein a request metrics message is transmitted from the target device to the at least one candidate device in response to receiving the poll metrics message, wherein a plurality of requested metrics are transmitted from the at least one candidate device to the target device via a requested metrics message, wherein the network management system is further configured to receive a polled metrics message that includes the requested metrics from the target device, wherein the validation is successful if a predetermined threshold of candidate devices exhibit a post-change level of power usage that is within a predetermined range of a pre-change level of power usage, and wherein the system is implemented using at least one processor.

* * * * *